United States Patent [19]

Kersting

[11] 3,778,119
[45] Dec. 11, 1973

[54] CONTROL VALVE
[75] Inventor: Raymond J. Kersting, Dellwood, Mo.
[73] Assignee: Wagner Electric Corporation, Newark, N.J.
[22] Filed: Aug. 24, 1971
[21] Appl. No.: 174,340

[52] U.S. Cl............ 303/68, 303/9, 303/13, 303/50, 303/85, 137/107
[51] Int. Cl............................................ B60t 15/02
[58] Field of Search................ 137/107, 112, 113; 303/29, 50, 37–39, 7, 13, 9, 71, 68–69, 82, 85

[56] References Cited
UNITED STATES PATENTS
3,109,455  11/1963  Horowitz et al. ............... 303/50 X
3,224,815  12/1965  Horowitz ......................... 303/85 X
3,617,097  11/1971  Grabb............................... 303/9 X
3,685,870   8/1972  Jensen .............................. 303/85 X

Primary Examiner—Duane A. Reger
Assistant Examiner—D. C. Butler
Attorney—Joseph E. Papin

[57] ABSTRACT

A control valve is provided with an application member for effecting the application therethrough of one supplied fluid pressure and driving a valve member to also effect the application through said control valve of another supplied fluid pressure, said application and valve members being movable toward positions isolating the one and other supplied fluid pressures and exhausting the applied fluid pressures, and resiliently urged means is provided to drive said application member to its isolating position in response to the reduction of the one supplied fluid pressure to a value less than a predetermined value.

This invention relates generally to control valves and in particular to a control valve for use in a fluid pressure system to control a spring set brake actuator thereof.

27 Claims, 3 Drawing Figures

PATENTED DEC 11 1973   3,778,119

INVENTOR:
RAYMOND J. KERSTING
BY: Joseph E. Papin 3,778,119

CONTROL VALVE

BACKGROUND OF THE INVENTION

In the past, tripping or automatically actuated push-pull type control valves have been utilized in fluid pressure systems for controlling the application and exhaustion of emergency fluid pressure to and from a fluid pressure released spring setting brake actuator to effect the desired actuation or de-actuation thereof; however, one of the more undesirable or disadvantageous features of such past control valves and systems was that said control valve sensed or was automatically responsive to the same emergency fluid pressure which it delivered to the system.

SUMMARY OF THE INVENTION

The principal object of the present invention is to respectively provide a brake system and a control valve therefor which overcome the aforementioned undesirable and disadvantageous features of such past systems and control valves, and this, as well as other objects and advantageous features of the present invention, will become apparent hereinafter.

Briefly, the invention comprises a brake system having a spring setting fluid pressure released brake actuator actuated in response to fluid pressure applied thereto less than a predetermined value for energizing a brake, and control means for selectively applying separate applied fluid pressures in excess of the predetermined value to said brake actuator and exhausting the applied fluid pressure therefrom including means responsive to one of the supplied fluid pressures less than another predetermined value for automatically actuating said control means to exhaust the applied fluid pressure. The invention also comprises a control valve having a pair of selectively movable members for effecting the application therethrough of separate supplied fluid pressures and exhausting the applied fluid pressure, and resiliently urged means responsive to one of the supplied fluid pressures less than the other predetermined value for driving one of said members to a position exhausting the applied fluid pressure.

DESCRIPTION OF THE DRAWINGS

In the drawings which illustrate embodiments of the invention and wherein like numerals refer to like parts wherever they occur.

Figure 1:
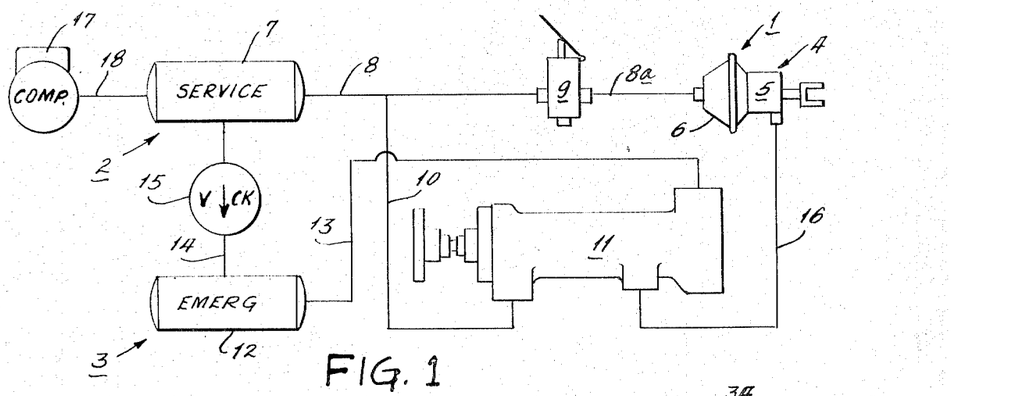
FIG. 1 is a schematic view of a fluid pressure system embodied in the present invention.

Referring now to the drawings in detail and in particular to FIG. 1, a dual fluid pressure or brake system 1 having service and emergency branches 2, 3 is shown for use on a vehicle having at least one spring setting fluid pressure released brake cylinder or actuator 4 of a type well known in the art and including a spring setting portion 5 and a fluid pressure responsive or motor portion 6 for energizing a vehicle brake (not shown). The service branch 2 is provided with a service reservoir 7 connected with the fluid pressure responsive motor 6 of the brake actuator 4 by conduits 8, 8a having the inlet and outlet sides of an operator actuated foot or application valve 9 of a type well known in the art serially interposed therebetween, and a conduit 10 is connected between the conduit 8 and one of the inlet ports of a push-pull type control valve 11. The emergency branch 3 includes an emergency or protected reservoir 12 which is connected to the other of the inlet ports of the control 11 by a conduit 13, and another conduit 14 having a uni-directional or one-way check valve 15 interposed therein is connected between the service and emergency reservoirs 7, 12. To complete the description of the system 1, another conduit 16 is connected between the outlet port of the control valve 11 and the spring set portion 5 of the brake actuator 4, and fluid pressure generating means, such as a compressor 17, is connected to the service reservoir 7 by a conduit 18.

Figure 2:
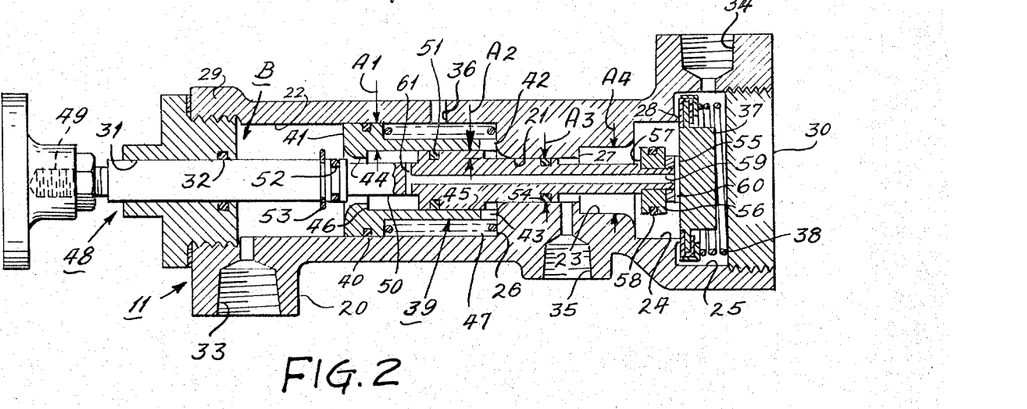
FIG. 2 is a sectional view illustrating the control valve shown in FIG. 1, also embodied in the present invention, in its intermediate or mid-operating position in cross-section.

Referring now to FIG. 2, the control valve 11 is provided with a housing 20 having a bore 21 interposed between a counterbore 22 and stepped counterbores 23, 24, 25, said bore and counterbore 21, 23 defining valve seats as discussed hereinafter. Opposed annular shoulders or abutments 26, 27 are defined in the housing 20 between the bore and counterbore 21, 22 and the bore and counterbore 21, 23, respectively, and another annular shoulder defining a valve seat 28 is provided on said housing between counterbores 24, 25. Closure members or end plugs 29, 30 are respectively threadedly received in the open ends of the counterbores 22, 25, and the closure member 29 is provided with an axial bore 31 therethrough in which is disposed an O-ring seal 32. A pair of inlet ports 33, 34 which receive the conduits 10, 13, as previously mentioned, are provided in the housing 20 intersecting with the counterbores 22, 25 adjacent to the closure members 29, 30, respectively, and an outlet port 35 which receives the conduit 16, as previously mentioned is also provided in said housing intersecting with the bore 21 adjacent to the housing shoulder 27. An exhaust port 36 is provided in the housing 20 intersecting with the counterbore 22 adjacent to the housing shoulder 26.

An application or valve member 37 is movable in the housing counterbore 25 and normally urged into sealing engagement with the housing valve seat 28 to interrupt pressure fluid communication between the inlet and outlet ports 34, 35 by the force of a valve spring 38 biased between said valve member and the closure member 30. An automatic actuating or resiliently urged member, such as the control piston 39, is slidably received in the housing counterbore 22 carrying a peripheral seal 40 in sealing engagement therewith, and opposed ends or abutment surfaces 41, 42 are provided on said control piston, said abutment surface 42 having a plurality of cross-slots or passages 43 therein. Axial stepped bores 44, 45 having a shoulder or abutment 46 therebetween are provided through the control piston 39 intersecting with the opposed ends 41, 42 thereof, respectively, and a spring 47 is compressed between the housing shoulder 26 and the control piston 39 urging the opposed end 42 thereof from abutting engagement with the cooperating housing shoulder 26 which defines the inoperative position of said control piston in the housing bore 22.

A selectively operable application member, such as the push rod indicated generally at 48 which is shown in FIG. 2 in its intermediate or mid-position, is slidably received in the closure member bore 31 in sealing engagement with the seal 32 thereof and has an exteriorly extending operator applied force receiving portion or end 49. A peripheral groove 50 is provided in the midportion of the rod 48, and peripheral seals 51, 52 are carried in said rod adjacent to the ends of said groove, said seal 51 being sealably engaged with the control piston stepped bore 45 and said seal 52 defining a valve member for sealing engagement with the control piston stepped bore 44. A stop or abutment, such as the snap ring and groove assembly 53, is provided on the rod 48 adjacent to the seal 52 for driving or abutting engagement with the control piston end 41, and another seal or valve member 54 is peripherally carried on said rod in sealing engagement with the housing bore 21 which defines a valve seat therefor. The rod 48 extends coaxially through the housing counterbore 23 having a free or driving end 55 in the housing counterbore 24 for abutting or driving engagement with the valve member 37, and a radially extending flange portion 56 is provided on said rod adjacent to said free end. The flange 56 is provided with a radially extending sidewall or abutment surface 57 for engagement with the housing shoulder 27 which defines the "out" position of the rod 48, as discussed hereinafter, and another seal or valve member 58 is peripherally carried in said flange for sealing engagement with the housing counterbore 23 which defines a valve seat therefor, as previously mentioned. An axial passage 59 is provided in the rod 48 having one end intersecting with a plurality of crossslots 60 provided in the rod free end 55, and the other end thereof is connected with a cross-passage 61 in said rod which in turn connects with the rod groove 50.

It should be noted than an annular effective area $A_1$ is defined on the control piston 39 between the respective sealing engagements of the seals 40, 51 with the housing counterbore 22 and the control piston stepped bore 45 for subjection to the fluid pressure at the inlet port 33, and with the rod 48 in its intermediate position, a pressure fluid flow passage, indicated generally at B, is provided through the control valve 11 and defined by the inlet port 33, the housing counterbore 22, the control piston stepped bores 44, 45, the rod passages 59, 60, 61, the housing bore and counterbores 21, 23, 24, and the outlet port 35. The rod is provided with an annular effective area $A_2$ defined between the sealing engagement of the seals 51, 54 with the control piston stepped bore 45 and the housing bore 21, respectively, and another effective area $A_3$ which is opposed and slightly less than the area $A_2$ is also provided on said rod being defined by the sealing engagement of the seal 54 with the housing bore 21; however, if desired the areas $A_2$, $A_3$ may be substantially equal to balance said rod in its intermediate position. To complete the description of the control rod 48, an effective area $A_4$ is also defined on the rod 48 by the sealing engagements of the seal 58 with the housing counterbore 23, and said area $A_4$ is opposed to and greater than the area $A_2$.

OPERATION

With the component parts of the control valve 11 in their intermediate positions as shown in FIG. 2, fluid pressure generated by the compressor 17 flows through the conduit 18 to the service reservoir 7 and therefrom through the conduit 14 and check valve 15 into the emergency reservoir 12. The emergency fluid pressure flows from the emergency reservoir 12 through the conduit 13 to the inlet port 34 and counterbore 25 of the control valve 11, and the service fluid pressure flows from the service reservoir 7 through conduits 8, 10, the flow passage B of said control valve, and the conduit 16 to the spring setting portion 5 of the brake actuator 4. The service fluid pressure in the flow passage B acts on the effective area $A_1$ of the control piston 39 to establish a control force F, and when the magnitude of the service fluid pressure is in excess of a predetermined value, e.g., in the range of 20 to 45 p.s.i., the control force F overcomes the opposing compressive force of the spring 47 to urge said control piston toward its inoperative position engaging the control piston end 42 with the housing abutment 26. Of course, when the magnitude of the service fluid pressure so delivered to the spring setting portion 5 of the actuator 4 is in excess of another predetermined value, e.g., in the range of 90 to 120 p.s.i., said brake actuator is deactuated and the brake (not shown) operatively connected therewith is de-energized. It should be noted that the service fluid pressure acts on the opposed differential effective areas $A_2$, $A_3$ of the rod 48 wherein a rather small holding force is established urging said rod rightwardly to engage the free end 55 thereof with the valve member 37; however, such holding force is opposed by the valve spring 38 to prevent the unseating of said valve member in response to such holding force. Nevertheless, if desired, the areas $A_2$, $A_3$ may be substantially equal wherein said rod, in effect, would be substantially balanced in its intermediate position.

In the event of the failure of the service fluid pressure due to compressor malfunction or a leak or the like in the system service branch 2 wherein the service fluid pressure is reduced below the other predetermined value, the control force F is correspondingly reduced in value, and the compressive force of the spring 47 is effective to automatically move the control piston 39 leftwardly to initially sealably engage the control piston valve seat 44 with the rod valve member 52 closing the flow passage B to isolate the supplied fluid pressure at the inlet port 33 from the applied fluid pressure at the outlet port 35 and thereafter drivingly engage the control piston and rod abutments 41, 53. Upon the engagement of the control piston and rod abutments 41, 53, the control piston and rod 39, 48 are thereafter concertedly movable to their respective operative and "out" positions. In the "out" position of the rod 48, the rod valve member 58 is moved into sealing engagement with the housing counterbore or valve seat 23, and the flange abutment 57 is moved into abutting engagement with the housing shoulder 27 to limit the concerted movement of the rod 48 and control piston 39 and define the respective "out" and operative positions thereof respectively. After the rod valve member 58 is engaged with the valve seat 23, the valve member 54 is disengaged from the housing bore or valve seat 21 to thereby establish pressure fluid communication between the outlet and exhaust ports 35, 36 wherein the applied fluid pressure is exhausted from the spring set portion 5 of the brake actuator 4 through the conduit 16, said outlet port, said housing bore and the housing counterbore 22 to said exhaust port. Upon such exhaustion of the applied fluid pressure, the spring set portion 5 of the brake actuator 4 is actuated to effect a spring set energization of the brake (not shown) connected therewith. With the control piston and rod 39, 48 in their respective operative and "out" positions, as described, the opposed differential areas $A_2$, $A_4$ are subjected to the same fluid pressure to establish a holding force acting in a leftwardly direction on said rod and additive to the force of the spring 47 to maintain said rod in its "out" position.

Of course, it is readily apparent that the rod 48 can be selectively and independently manually moved to its "out" position in response to an operator force selectively applied on the knob 49, and such selective manual movement of said rod is relative to the control piston 39 in its inoperative position when the service fluid pressure is in excess of the other predetermined value. If the rod 49 is selectively manually moved to its "out" position, the sealing engagement of the valve member 58 with the housing counterbore or seat 23 is effective to close the flow passage B and isolate the supplied fluid pressure at the inlet port 33 from the applied fluid pressure at the outlet port 35, and the disengagement of the valve member 54 from the housing bore or seat 21 effects the exhaustion of the applied fluid pressure and the actuation of the spring setting portion 5 of the brake actuator 4 in the same manner as previously described. When the rod 49 is manually moved to its "out" position, the service fluid pressure in the housing counterbore 24 acts on the effective area $A_4$ on the flange 56 to establish the aforementioned holding force acting in a leftward direction to maintain said rod in its "out" position.

With the rod and control piston 48, 39 urged to their respective "out" and operative positions by the compressive force of the spring 47, as described hereinbefore, the operator can, if desired, override the automatic actuation of the control valve 11 by the control piston and spring 39, 47. The override is accomplished by applying and maintaining a manual force on the exterior end 49 of the rod 48 to manually move said rod to its "in" position against the compressive forces of the springs 38, 47, the holding force of the service fluid pressure acting on the opposed differential areas $A_2$, $A_4$, and the force of the emergency fluid pressure on the counterbore 25 acting on the effective area of the valve member 37 which is defined by the sealing engagement thereof with the housing valve seat 28. In the "in" position, the rod 48 is moved rightwardly to initially re-engage the valve member 54 with its seat 21 to isolate the exhaust at 36 and disengage the valve member 58 from its seat 23, and thereafter the rod free end 55 is drivingly engaged with the valve member 37 to effect movement thereof toward a position disengaged from the housing valve seat 28 to establish open pressure fluid communication between the inlet and outlet ports 34, 35. With the valve member 37 disengaged from the valve seat 28, the emergency fluid pressure flows from the emergency reservoir 12 through the conduit 13, the inlet port 34 of the control valve 11, the housing bore and counterbores 21, 23, 24, 25, the outlet port 35, and the conduit 16 to the spring set portion 5 of the brake actuator 4 to effect de-actuation thereof and the de-energization of the brake connected therewith. It should be noted that when the rod 48 is moved to its "in" position that the aforementioned forces opposing such movement are eliminated and replaced by another holding force defined by the emergency fluid pressure acting on the opposed differential areas $A_2$, $A_3$ and acting in a rightwardly direction to assist the manually applied force urging the rod 48 toward its "in" position.

It is, of course, desirable to override the automatic actuation of the control valve 11 and de-energize the brake to permit movement of the veicle to a safe or off-the-road parking position until the service branch 2 can be repaired and the system 1 is once again operable. When the vehicle has been moved to a desired location for the repair of the system 1, the manually applied force is removed from the rod 48 wherein the compressive forces of the springs 38, 47 are respectively operable to return the valve member 37 to its position engaged with the housing valve seat 28 and to return the control piston and rod to their respective "out" and operative positions. Upon the return of the rod 48 to its "out" position, the valve member 58 is again engaged with the housing counterbore or seat 23, and the valve member 54 is again disengaged from the housing bore or seat 21 to exhaust the applied fluid pressure from the spring set portion 5 of the actuator 4 to again actuate said actuator and energize the brakes, as previously described.

Of course, it is again apparent that when the control piston 39 is urged to its inoperative position in response to the control force F acting thereon, the rod 48 is selectively movable from its "out" position to its intermediate position independently of and relative to said control piston, and in this instance, the selective movement of said rod to its intermediate position reapplies the re-established service fluid pressure through the flow passage B to de-actuate the spring setting portion 5 of the brake actuator, as previously described.

Figure 3:
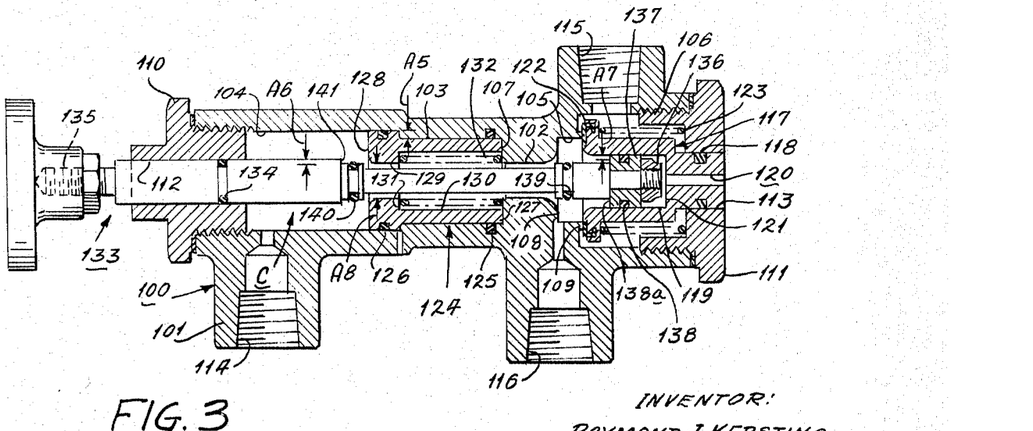
FIG. 3 is a sectional view illustrating another embodiment of a control valve for use in the system of FIG. 1 in cross-section.

Referring now to FIG. 3, another control valve 100 is shown having substantially the same component parts and operable in the system 1 substantially in the same manner as the previously described control valve 11.

The control valve 100 is provided with a housing 101 having a bore 102 therein interposed between opposed stepped counterbores 103, 104 and 105, 106. An annular shoulder 107 is provided on the housing 101 between the bore 102 and counterbore 103, and other annular shoulders 108, 109 are provided on said housing between said bore and counterbore 105 and between the counterbores 105, 106, respectively, said shoulder 109 defining a valve seat. Closure members or end plugs 110, 111 having axial bores 112, 113 therethrough are threadedly received in the open ends of the counterbores 104, 106, respectively. A pair of inlet ports 114, 115 which receive the conduits 10, 13 of the system 1 are provided in the housing 101 intersecting with the counterbores 104, 106 adjacent to the closure members 110, 111, respectively, and an outlet port 116 which receives the conduit 16 of said system is also provided in said housing intersecting with the counterbore 105.

An application or valve member, such as the stepped piston 117, is slidably received in the closure member bore 113 carrying a peripheral seal 118 in sealing engagement therewith, and stepped bores 119, 120 having an annular shoulder or abutment 121 therebetween are axially provided in said piston defining an exhaust passage therethrough, said stepped bore 119 also defining a valve seat as discussed hereinafter. An annular valve element or seal 122 is provided on one end of the piston 117, and a valve spring 123 biased between said piston and the closure member 111 urges said valve member into sealing engagement with the housing valve seat 109 to interrupt pressure fluid communication between the inlet and outlet ports 115, 116.

An automatic actuating or resiliently urged member, such as the stepped control piston 124, is slidably received in the housing counterbores 103, 104 carrying axially spaced, peripheral seals 125, 126 in sealing engagement therewith, respectively, and opposed ends or abutment surfaces 127, 128 are provided on said control piston. Axial stepped bores 129, 130 having an annular shoulder 131 therebetween are provided through the control piston 124 intersecting with the opposed ends 127, 128 thereof, respectively, and a spring 132 is compressed between the housing and control piston shoulders 107, 131 urging the control piston opposed end 127 from abutting engagement with the cooperating housing shoulder 107 which defines the inoperative position of said control piston in the housing counterbores 103, 104.

A selectively operable application member, such as the push rod indicated generally at 133 which is in its intermediate or mid-position, is slidably received in the closure member bore 112 carrying a peripheral seal 134 in sealing engagement therewith and has an exteriorly extending operator applied force receiving portion or end 135. The rod 133 is provided with an interior or free end portion 136 for driving engagement with the shoulder 121 of the piston 117, and a radially extending flange 137 is fixedly received on said rod free end portion and slidably received in the piston stepped bore 119. A seal or exhaust valve member 138 is peripherally carried in the rod flange 137 for sealing engagement with the piston stepped bore 119 which defines a valve seat therefor to isolate the outlet port 116 from the atmosphere through the exhaust passage 119, 120, and a shoulder or abutment surface 138a is provided on said rod flange for abutting engagement with the cooperating housing shoulder 108 which defines the "out" position of the rod 133, as discussed hereinafter. Spaced peripheral seals or valve members 139, 140 are carried on the rod 133 for sealing engagement with the housing bore 102 and the control piston stepped bore 129 which define cooperating valve seats therefor, respectively, and an annular shoulder or abutment 141 is provided on said rod for abutting or driving engagement with the control piston end 128.

It should be noted that the control piston 124 is provided with an annular effective area $A_5$ defined between the sealing engagements of the seals 125, 126 with the housing counterbores 103, 104, respectively, and said area $A_5$ is subjected to the fluid pressure at the inlet port 114. The rod 133 is provided with an annular effective area $A_6$ defined between the sealing engagement of the seal 134 with the closure member bore 112 and the sealing engagement of the seal 139 with the housing bore 102 or the seal 140 with the control piston stepped bore 129. Another annular effective area $A_7$ is provided on the rod 133 between the sealing engagement of the seals 134, 138 with the closure member bore 112 and the piston stepped bore 119, said area $A_7$ being opposed to the area $A_6$, and the sealing engagement of the seal 140 with the control piston stepped bore 129 also defines another effective area $A_8$ on said rod for subjection to the fluid pressure at the inlet port 115, as discussed hereinafter. To complete the description of the control valve 100, with the rod 133 in its intermediate position, a pressure fluid flow passage, indicated generally at C, is provided through said control valve and defined by the inlet port 114, the housing counterbore 104, the control piston stepped bores 129, 130, the housing bore and counterbore 102, 105, and the outlet port 116.

With the component parts of the control valve 100 in their intermediate positions as shown in FIG. 3, fluid pressure generated by the compressor 17 flows through the conduit 18 to the service reservoir 7 and therefrom through the conduit 14 and check valve 15 to the emergency reservoir 12. The emergency fluid pressure flows from the emergency reservoir 12 through the conduit 13 to the inlet port 115 and housing counterbore 106 of the control valve 100, and the service fluid pressure flows from the service reservoir 7 through conduits 8, 10, the flow passage C of said control valve, and the conduit 16 to the spring setting portion 5 of the brake actuator 4. The service fluid pressure in the flow passage C acts on the effective area $A_5$ of the control piston 124 to establish a control force $F_1$, and when the magnitude of the service fluid pressure is in excess of a predetermined value, e.g., in the range of 20 to 45 p.s.i., the control force $F_1$ overcomes the opposing compressive force of the spring 132 to urge said control piston toward its inoperative position engaging the control piston end 127 with the housing abutment 107. Of course, when the magnitude of the service fluid pressure so delivered to the spring setting portion 5 of the actuator 4 is in excess of another predetermined value, e.g., in the range of 90 to 120 p.s.i., said brake actuator is de-actuated and the brake (not shown) operatively connected therewith is de-energized. It should be noted that the service fluid pressure acts on the effective area $A_7$ of the rod 133 to establish a rightwardly directed holding force urging the free end 136 of the rod 133 toward abutting engagement with the piston shoulder 121, but the compressive force of the piston spring 123 is greater than said holding force thereby obviating displacement of the piston 117 in response to said holding force.

In the event of the failure of the service fluid pressure due to compressor malfunction or a leak or the like in the system service branch 2 wherein the service fluid pressure is reduced below the other predetermined value, the control force $F_1$ is correspondingly reduced in value, and the compressive force of the spring 132 is effective to automatically move the control piston 124 leftwardly to initially sealably engage the control piston seat or stepped bore 129 with the rod valve member 140 closing the flow passage C to isolate the supplied fluid pressure at the inlet port 114 from the applied fluid pressure at the outlet port 116 and thereafter drivingly engage the control piston and rod abutments 128, 141. Upon the engagement of the control piston and rod abutments 128, 141, the control piston and rod 124, 133 are thereafter concertedly movable to their respective operative and "out" positions. In the "out" position of the rod 133, the rod valve member 139 is moved leftwardly into sealing engagement with the housing bore or valve seat 102, and the rod valve member 138 is disengaged from the piston bore or valve seat 119 to thereby open the piston exhaust passage and establish pressure fluid communication therethrough between the outlet port 116 and the atmosphere wherein the applied fluid pressure is exhausted from the spring set portion 5 of the brake actuator 4 through the conduit 16, said outlet port, the housing counterbore 105 and the piston stepped bores or exhaust passage 119, 120. At the same time, the flange abutment 138a is moved into abutting engagement with the housing shoulder 108 to limit the concerted movement of the control piston and rod 124, 133 and define the respective operative and "out" positions thereof. Upon such exhaustion of the applied fluid pressure, the spring set portion 5 of the brake actuator 4 is actuated to effect a spring set energization of the brake connection therewith. With the control piston and rod 124, 133 in their respective operative and "out" positions, the prevailing fluid pressure in the inlet port 114 acts on the effective area $A_6$ of the rod 133 to establish a leftwardly directed holding force additive to the force of the spring 132 to maintain said rod in its "out" position.

Of course, it is readily apparent that the rod 133 can be selectively and independently manually moved to its "out" position in response to an operator force selectively applied to the knob 135, and such selective manual movement of said rod is relative to the control piston 124 in its inoperative position when the service fluid pressure is in excess of the other predetermined value. As the rod 133 is selectively manually moved to its "out" position, the sealing engagement of the rod valve member 139 with the housing bore or seat 102 is effective to close the flow passage C and isolate the supplied fluid pressure at the inlet port 114 from the applied fluid pressure in the outlet port 116, and the disengagement of the rod valve member 151 from the piston stepped bore 119 effects the exhaustion of the applied fluid pressure and the actuation of the spring setting portion 5 of the brake actuator 4 in the same manner as previously described. When the rod 133 is moved either automatically or manually, as discussed hereinabove, to its "out" position, the service fluid pressure in the housing counterbore 104 acts on the effective area $A_6$ of the rod 133 to establish the aforementioned holding force acting in a left direction to maintain said rod in its "out" position.

With the control piston and rod 124, 133 urged to their respective operative and "out" positions by the compressive force of the spring 132, as described hereinbefore, the operator can, if desired, override the automatic actuation of the control valve 100 by the control piston and spring 124, 132. The override is accomplished by applying and maintaining a manual force on the exterior end 135 of the rod 133 to manually move said rod to its "in" position against the compressive force of the control piston spring 132, the valve spring 123, the holding force of the service fluid pressure acting on the area $A_6$, and the force of the emergency fluid pressure in the housing counterbore 106 acting on the effective area of the piston 117 which is defined by the sealing engagement thereof with the housing seat 109. In the "in" position, the rod 133 is moved rightwardly to initially re-engage the rod valve member 138 with the piston stepped bore or seat 119 to close the exhaust passage 119, 120, isolating the outlet port 116 from the atmosphere and thereafter the rod free end 136 is drivingly engaged with the shoulder 121 of the valve piston 117 to effect the movement thereof toward a position disengaged from the housing valve seat 109 to establish open pressure fluid communication between the inlet and outlet ports 115, 116. With the valve member piston 117 disengaged from the housing valve seat 109, the emergency fluid pressure flows from the emergency reservoir 12 through the conduit 13, the inlet port 115 of the control valve 100, the housing counterbore 105, 106, the outlet port 116 and the conduit 16 to the spring set portion 5 of the brake actuator 4 to effect deactuation thereof and the de-energization of the brake connected therewith. With the rod 133 in its "in" position, the aforementioned force of the emergency fluid pressure acting on the effective area of the piston 117 is, of course, eliminated, and the fluid pressure differential of the service and emergency fluid pressures acting across the control piston 124 on the effective area thereof which is defined between the sealing engagements of the seals 125, 140 with the housing and control piston bores 103, 129 creates a leftwardly directed force in opposition to the manually applied fluid pressure in the outlet port 116 acts on the effective area $A_7$ of said rod to establish another holding force acting in a rightward direction to maintain said rod in its "in" position.

It is, of course, desirable to override the automatic actuation of the control valve 100 and de-energize the brake to permit movement of the vehicle to a safe or off-the-road parking position until the service branch 2 can be repaired and the system 1 is again operable. When the vehicle has been moved to a desirable location for the repair of the system 1, the manually applied force is removed from the rod 133 wherein the compressive forces of the spring 132, 123 are respectively operable to return the valve member piston 117 to its position engaged with the housing valve seat 109 and to return the control piston and rod to their respective "out" and operative positions. Upon the return of the rod 133 to its "out" position, the rod valve member 140 is again engaged with the control piston stepped bore or seat 129, and the rod valve member 138 is again disengaged from the valve member piston stepped bore 119 to exhaust the applied fluid pressure from the spring set portion 5 of the actuator 4 and again actuate said actuator and energize the brakes, as previously described.

Of course, it is again apparent that when the control piston is urged to its inoperative position in response to the control force $F_1$ acting thereon, the rod 133 is selectively movable between its "out" and "in" positions independently of and relative to said control piston.

From the foregoing, it is now apparent that a novel fluid pressure system 1 and control valves 11, 100 therefor meeting the objects and advantages set forth hereinbefore, as well as others, are provided and that changes as to the precise configurations, shapes and details set forth in the disclosure by way of illustration may be made by those skilled in the art without departing from the spirit of the invention.

I claim:

1. A control valve comprising a housing, a pair of pressure fluid flow passages in said housing for separate supplied fluid pressures and connected in parallel flow relation therein, a pair of members concertedly and relatively movable in said flow passges for controlling the applications therethrough of the supplied fluid pressures, respectively, a free end portion on one of said members for driving engagement with the other of said members, said one member being movable relative to said other member between one position effecting the application through one of said flow passages of one supplied fluid pressure and another position isolating the one supplied fluid pressure and engaging said free end portion with said other member to concertedly move it from an isolating position in the other of said flow passages isolating the other supplied fluid pressure toward an applying position effecting the application through said other flow passage of the other supplied fluid pressure, and resiliently urged means movable in said housing for driving engagement with said one member and subjected to the one supplied fluid pressure including passage means through which said one member extends defining with said one member a portion of said one flow passage, said resiliently urged means being movable in response to the one supplied fluid pressure less than a predetermined value acting thereon to drivingly engage and concertedly move said one member toward a venting position in said housing isolating the one supplied fluid pressure and venting the applied fluid pressure when said other member is in its isolating position.

2. A control valve according to claim 1, comprising opposed abutment means on said one member and resiliently urged means for driving engagement, said opposed abutment means being drivingly engaged upon the concerted movement of said one member and resiliently urged means to the venting position.

3. A control valve according to claim 1, comprising valve means on said one member for engagement with said resiliently urged means to isolate the one supplied fluid pressure in said one flow passage from the applied fluid pressure upon the concerted movement of said one member and resiliently urged means to the venting position.

4. A control valve according to claim 3, comprising means on said resiliently urged means defining a valve seat about said passage means for engagement with said valve means, said valve seat being movable into engagement with said valve means to close said passage means and isolate the one supplied fluid pressure in said one flow passage from the applied fluid pressure upon the concerted movement of said resiliently urged means and one member toward the venting position.

5. A control valve according to claim 4, comprising second passage means in said other member for the venting passage therethrough of the applied fluid pressure, means in said other member defining a second valve seat about said second passage means, second valve means on said one member adjacent to said free end portion for engagement with said second valve seat, said second valve means being movable toward a position disengaged from said second valve seat to effect the venting passage therethrough of the applied fluid pressure upon the concerted movement of said resiliently urged means and one member toward the venting position.

6. A control valve according to claim 5, comprising a third valve seat on said housing about said other flow passage, said other member including third valve means for engagement with said third valve seat, said third valve means being normally urged toward its isolating position into engagement with said third valve seat and being movable toward its applying position disengaged from said third valve seat upon the movement of said one member toward its other position drivingly engaging said free end portion with said other member.

7. A control valve according to claim 1, wherein said resiliently urged means includes abutment means for driving engagement with said one member, said abutment means being moved into engagement with said one member to effect the concerted movement thereof with said resiliently urged means to the venting position.

8. A control valve according to claim 1, comprising valve means on one of said resiliently urged means and one member for engagement with the other of said resiliently urged means and one member controlling said one flow passage, said valve means being movable into engagement between said one and other of said resiliently urged means and one member to close said one flow passage and isolate the one supplied fluid pressure upon the concerted movement of said resiliently urged means and one member to the venting position.

9. A control valve according to claim 8, comprising a pair of abutment means on said resiliently urged means and one member for driving engagement, respectively, said abutment means on said resiliently urged means being movable therewith into driving engagement with said abutment means on said one member subsequent to the engagement of said other valve means between said one and other of said resiliently urged means and one member upon the concerted movement of said resiliently urged means and one member to the venting position.

10. A control valve according to claim 1, comprising abutment means on said housing for engagement with said resiliently urged means and defining the inoperative position thereof, said resiliently urged means being urged in response to the one supplied fluid pressure in excess of the predetermined value acting thereon toward engagement with said abutment means.

11. A control valve according to claim 10, wherein said resiliently urged means includes piston means movable in said housing and having opposed end portions, one of said end portions being engaged with said abutment means when said resiliently urged means is in its inoperative position, the other of said end portions including other abutment means for engagement with said one member, and an effective area subjected to the first named supplied fluid pressure, spring means engaged between said piston means and housing urging said one end portion from said first named abutment means and said other abutment means toward engagement with said one member, said passage means being in said piston means between said one and other end portions a valve seat on said piston means about said passage means, and valve means on said one member for engagement with said passage means, said piston means being movable against the force of said spring means toward its inoperative position engaging said one end portion with said first named abutment means in response to the one supplied fluid pressure in excess of the predetermined value acting on said area and said piston means also being movable in response to the force of said spring means to initially engage said valve seat with said valve means closing said passage means and isolating the one supplied fluid pressure and thereafter drivingly engage said other abutment means with said one member to effect the concerted movement thereof with said piston means to the venting position when the one fluid pressure acting on said area is less than the predetermined value.

12. A control valve according to claim 1, comprising means on said resiliently urged means defining a valve seat about said passage means, second passage means in said housing for the venting passage therethrough of the applied fluid pressure and connected with said one and other flow passages, means in said housing defining a second valve seat about said flow passage, said one member including rod means movable in said first named and second passage means, said free end portion being on said rod means, third passage means in said rod means also defining a portion of said one flow passage having one end connected in pressure fluid communication with said first named passage means and the other end thereof intersecting with said free end portion, spaced first and second valve means on said rod means for respective engagement with said first named and second valve seats, said first named valve seat being initially moved into engagement with said first valve means closing said first named passage means and isolating the one supplied fluid pressure in said one flow passage from the applied fluid pressure and said second valve means being thereafter moved toward a position disengaged from said second valve seat to open said second passage means venting the applied fluid pressure therethrough upon the concerted movement of said resiliently urged means and one member toward the venting position.

13. A control valve according to claim 12, comprising abutment means on said rod means for engagement with said resiliently urged means, said abutment means being engaged by said resiliently urged means subsequent to the engagement of said first valve means with said first named valve seat upon the concerted movement of said resiliently urged means and one member toward the venting position.

14. A control valve according to claim 12, comprising means in said housing defining a third valve seat about said second passage means and spaced from said second valve seat, third valve means on said rod means adjacent to said free end portion for engagement with said third valve seat, said second valve means being intermediate said first and third valve means, said third valve means being movable into engagement with said third valve seat upon the concerted movement of said resiliently urged means and one member to the venting position to insure the isolation of the one supplied fluid pressure in said one flow passage in the event of subsequent movement of said resiliently urged means toward its normal inoperative position in said housing and relative to said one member in the venting position thereof disengaging said first named valve seat from said first valve means when the one supplied fluid pressure acting on said resiliently urged means exceeds the predetermined value.

15. A control valve according to claim 1, comprising an exhaust passage in said other member for the exhausting passage therethrough of the applied fluid pressure, means on said other member defining a valve seat about said exhaust passage, and valve means on said one member adjacent to said free end portion for engagement with said valve seat, said valve means being movable toward a position disengaged from said valve seat opening said exhaust passage to effect the exhausting passage therethrough of the applied fluid pressure upon the concerted movement of said one member and resiliently urged means toward the venting position.

16. A control valve according to claim 1, wherein said resiliently urged means includes a piston movable in said housing and having opposed end portions, said passage means being in said piston and intersecting with said end portions, an effective area on one of said end portions subjected to the one supplied fluid pressure, and a spring engaged with said piston urging said one end portion toward driving engagement with said one member, the one supplied fluid pressure in excess of the predetermined value acting on said area to urge said piston toward an inoperative position engaging the other of said end portions into engagement with said housing.

17. A control valve according to claim 16, comprising means on said piston defining a valve seat about said passage means, valve means on said one member for engagement with said valve seat, said piston being movable in response to the compressive force of said spring to engage said valve seat with said valve means isolating the one supplied fluid pressure and thereafter engage said one end portion with said one member to concertedly drive said one member to the venting position when the one supplied fluid pressure acting on said area is less than the predetermined value.

18. A control valve according to claim 17, comprising other passage means in said housing for the venting passage therethrough of the applied fluid pressure and connected with said one and other flow passages, a second valve seat in said housing about said other passage means, said one member including rod means slidable in said first named and other passage means, said first named valve means and free end portion being on said rod means, third passage means in said rod means also defining a portion of said one flow passage having one end connected in pressure fluid communication with said first named passage means and the other end thereof connected with said free end portion, second valve means on said rod means for engagement with said second valve seat, said second valve means being movable toward a position disengaged from said second valve seat to open said second passage means venting the applied fluid pressure therethrough upon the concerted movement of said piston and one member toward the venting position.

19. A control valve according to claim 18, comprising a third valve seat in said housing about said other flow passage, said other member including third valve means for engagement with said third valve seat, said third valve means being normally urged toward its isolating position into engagement with said third valve seat and said third valve means being movable toward its applying position disengaged from said third valve seat upon the movement of said one member toward its other position drivingly engaging said free end portion with said third valve means.

20. A control valve according to claim 18, comprising means in said housing defining a third valve seat about said second passage means and spaced from said second valve seat, said second valve seat being intermediate said first named and third valve seats, third valve means on said rod means adjacent to said free end portion for engagement with said third valve seat, said third valve means being movable into engagement with said third valve seat upon the concerted movement of said piston and rod means to the venting position in order to insure the isolation of the one supplied fluid pressure in said one flow passage in the event of the subsequent movement of said piston toward its inoperative position against said spring and relative to said rod means in its venting position disengaging said first named valve seat from said first valve means when the one supplied fluid pressure acting on said area exceeds the predetermined value.

21. A control valve comprising a housing having outlet and exhaust ports and a pair of inlet ports therein, a first valve member movable in said housing for controlling pressure fluid communication between one of said inlet ports and said outlet port, a second valve member movable in said housing including abutment means for driving engagement with said first valve member, a pair of valve means for controlling pressure fluid communication between the other of said inlet ports and said outlet pot, and exhaust valve means for controlling pressure fluid communication between said outlet and exhaust ports, said second valve member being movable in one direction in response to an applied force thereon to move one of said valve means toward a position interrupting pressure fluid communication between said other inlet port and said outlet port and engage said abutment means with said first valve member to effect the concerted movement thereof toward a position establishing pressure fluid communication between said one inlet port and said outlet port and said second valve member also being movable in a direction opposite the one direction in response to an applied force thereon to concertedly move the other of said valve means and said exhaust valve means toward venting positions respectively interrupting pressure fluid communication between said other inlet port and said outlet port and establishing pressure fluid communication between said exhaust and outlet ports, and resiliently urged means subjected to the fluid pressure at said other inlet port and movable in said housing for driving engagement with said second valve member, said resiliently urged means being movable in response to the fluid pressure at said other inlet port less than a predetermined value to engage and concertedly drive said second valve member in the opposite direction and thereby move said other valve means and exhaust valve means to their venting positions.

22. A control valve comprising a housing having a pair of inlet ports and an outlet port therein, a first valve seat in said housing between one of said inlet ports and said outlet port, first valve means movable in said housing and normally urged into engagement with said first valve seat interrupting pressure fluid communication between said one inlet port and said outlet port, said first valve means including first passage means connected between said outlet port and the atmosphere, and means defining a second valve seat about said first passage means, resiliently urged means movable in said housing including second passage means connected between the other of said inlet ports and said outlet port, and means defining a third valve seat about said second passage means, a valve operating member movable in said housing between a normal operating position and opposed translated positions and extending through said second passage means including a pair of abutment means for respective engagement with said first valve means and said resiliently urged means, second valve means engaged with said second valve seat closing said first passage means in the normal operating position of said valve operating member, and third valve means for engagement with said third valve seat and displaced therefrom to establish pressure fluid communication through said second passage means between said other inlet port and said outlet port in the normal operating position of said valve operating member, said valve operating member being movable in response to an applied force thereon from its normal operating position toward one of its opposed translated positions to drivingly engage one of said abutment means with said first valve means to move said first valve means toward a position disengaged from said first valve seat establishing pressure fluid communication between said one inlet port and said outlet port and also to move said third valve means into engagement with said valve seat to close said second passage means interrupting pressure fluid communication therethrough between said other inlet port and said outlet port, and said resiliently urged means being movable in response to fluid pressure less than a predetermined value at said other inlet port acting thereon to initially move said third valve seat into engagement with said third valve means closing said second passage means and interrupting pressure fluid communication therethrough and drivingly engage the other of said abutment means to thereafter concertedly move said valve operating member from its normal operating position toward the other of its opposed translated positions and disengage said second valve means from said second valve seat to establish venting communication between said outlet port and the atmosphere through said first named passage means when said first valve means is engaged with said first valve seat.

23. A control valve according to claim 22, wherein said resiliently urged means includes piston means movable in said housing and having opposed end portions, said second passage means intersecting with said opposed end portions, an effective area defined on one of said end portions and subjected to the fluid pressure at said other inlet port, third abutment means on said one end portion for engagement with said other abutment means, spring means engaged between said housing and piston means urging said third abutment means toward engagement with said other abutment means, and said third valve seat being on said piston means, the compressive force of said spring means urging said piston means in a direction to initially effect the engagement of said third valve seat with said third valve means and drivingly engage said third abutment means with said other abutment and thereafter concertedly move said piston means to its one translated position.

24. A control valve according to claim 22, comprising a fourth valve seat in said housing between said one inlet port and said outlet port, fourth valve means on said valve operating member for engagement with said fourth valve seat and disengaged therefrom in the normal operating position of said valve operating member, said valve operating member also being movable from its normal operating position in response to an applied force thereon to its other translated position to initially move said fourth valve means into engagement with said fourth valve seat interrupting pressure fluid communication between said one inlet port and said outlet port and thereafter disengage said second valve means from said second valve seat.

25. A control valve comprising a housing having a pair of outlet ports, an outlet port and an exhaust port therein, a first valve seat in said housing between one of said inlet ports and said outlet port, first valve means movable in said housing and normally urged toward engagement with said first valve seat interrupting pressure fluid communication between said one inlet port and said outlet port, a second valve seat in said housing between said outlet and exhaust ports, resiliently urged means movable in said housing including a first passage for connecting the other of said inlet ports in pressure fluid communication with said outlet port, and means defining a third valve seat about said first passage, said resiliently urged means being normally urged against its own force in response to the fluid pressure in excess of a predetermined value at said other inlet port acting thereon toward an inoperative position in said housing, a valve operating member reciprocally movable in said housing between a normal operating position and opposed translated positions and extending through said first passage including a pair of abutments for respective engagement with said resiliently urged means and first valve means, second valve means engaged with said second valve seat and interrupting pressure fluid communication between said outlet and exhaust ports in the normal operating position of said valve operating member, third valve means for engagement with said third valve seat and disengaged therefrom in the normal operating position of said valve operating member, and second passage having one end connected in pressure fluid communication with said first passage and the other end thereof connected in pressure fluid communication with said outlet port in the normal operating position of said valve operating member, said valve operating member being movable from its normal operating position toward one of its opposed translated positions in response to an applied force thereon to drivingly engage one of said abutments with said first valve means urging it toward a position disengaged from said first valve seat establishing pressure fluid communication between said one inlet port and said outlet port and also moving said third valve means into engagement with said third valve seat closing said first and second passages to interrupt pressure fluid communication therethrough between said other inlet port and said outlet port, and said resiliently urged means being movable in response to its own force when the fluid pressure acting thereon at said other inlet port is less than a predetermined value to initially engage said third valve seat with said third valve means closing said first and second passages to interrupt pressure fluid communication therethrough and drivingly engage the other of said abutments to thereafter concertedly move said valve operating member from its normal operating position toward the other of its opposed translated positions and disengage said second valve means from said second valve seat establishing pressure fluid communication between said outlet and exhaust ports when said first valve means is engaged with said first valve seat.

26. A control valve according to claim 25, a fourth valve seat in said housing between said outlet port and said first valve seat, and fourth valve means on said valve operating member for engagement with said fourth valve seat, said valve operating member being movable from its normal operating position to its other translated position in response to an applied force thereon and independently of said resiliently urged means in its inoperative position to engage said fourth valve means with said fourth valve seat interrupting pressure fluid communication between said other inlet port and said outlet port prior to the disengagement of said second valve means from said second valve seat.

27. A control valve according to claim 25, wherein said resiliently urged means includes piston means movable in said housing between said other inlet port and said exhaust port, a pair of opposed end portions on said piston means, said first passage intersecting with said end portions, an effective area defined on one of said end portions and subjected to the fluid pressure at said other inlet port, a third abutment on said one end portion for engagement with said other abutment, said third valve seat being on said piston means, and spring means engaged between said piston means and housing, said piston means being movable toward its inoperative position against the force of said spring means in response to the fluid pressure in excess of the predetermined value at said other inlet port acting on said area and said piston means also being movable in response to the force of said spring means to effect the engagement of said third valve seat with said third valve means and drivingly engage said third abutment with said other abutment and thereafter concertedly move said piston means to its one translated position, and seal means engaged between said valve operating member and said first passage isolating said first passage from said exhaust port.

* * * * *

UNITED STATES PATENT OFFICE
CERTIFICATE OF CORRECTION

Patent No. 3,778,119          Dated December 11, 1973

Inventor(s) Raymond J. Kersting

It is certified that error appears in the above-identified patent and that said Letters Patent are hereby corrected as shown below:

Column 9, line 9, "tion" should read -- ted --. Column 10, line 14, after "applied" insert -- force on the rod exterior end 135, and the applied --. Column 15, line 10, "pot" should read -- port --.

Signed and sealed this 9th day of July 1974.

(SEAL)
Attest:

McCOY M. GIBSON, JR.          C. MARSHALL DANN
Attesting Officer             Commissioner of Patents